Aug. 3, 1926.　　　　　J. H. BUFFINGTON ET AL　　　1,594,710
TIRE CARRIER AND COVER
Filed Oct. 12, 1922
*Fig. 1.*
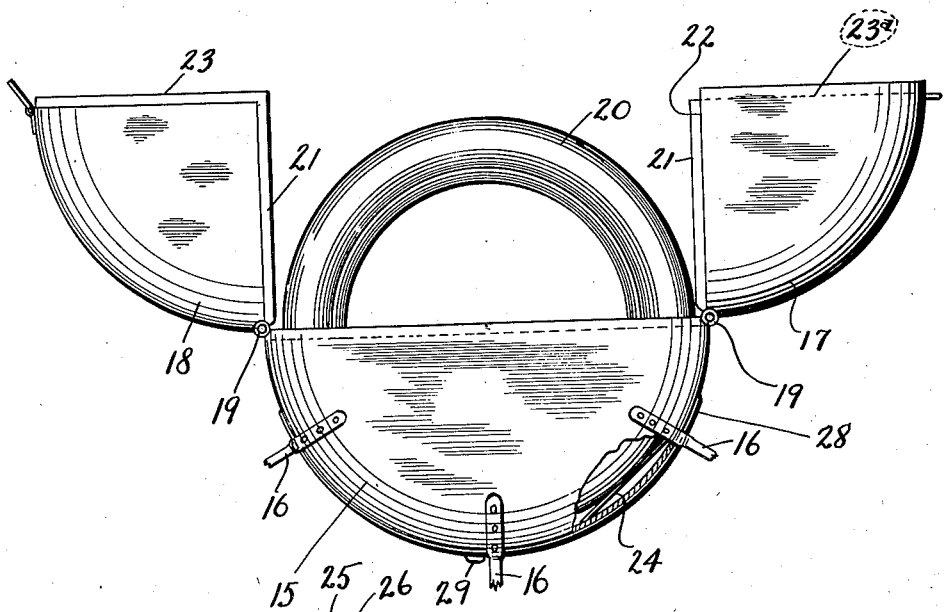
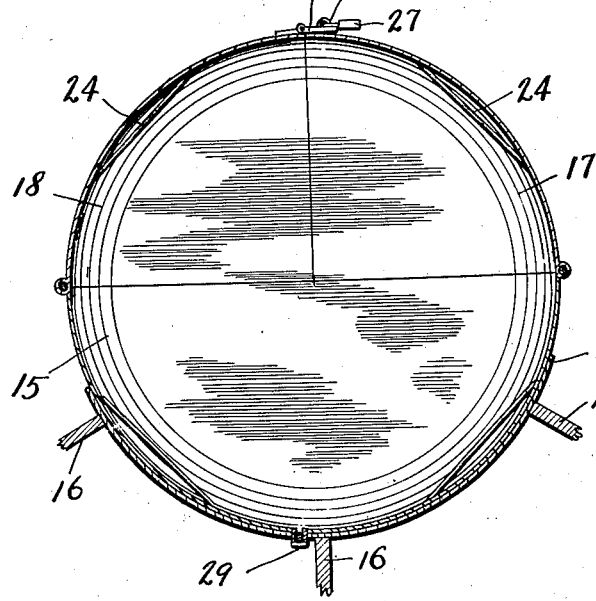
*Fig. 2.*
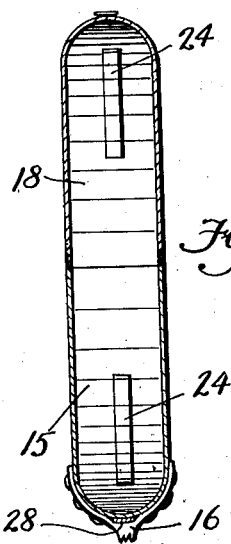
*Fig. 3.*
Inventors
John H. Buffington
Lincoln L. Whitson
by Hazard and Miller
ATTYS Patented Aug. 3, 1926.

1,594,710

UNITED STATES PATENT OFFICE.

JOHN H. BUFFINGTON AND LINCOLN L. WHITSON, OF HOLLYWOOD, CALIFORNIA, ASSIGNORS OF ONE-THIRD TO WILLIAM FAIRBANKS, OF HOLLYWOOD, CALIFORNIA.

TIRE CARRIER AND COVER.

Application filed October 12, 1922. Serial No. 593,985.

Our invention relates to tire carriers for motor vehicles, and a purpose of our invention is the provision of a tire carrier which is constructed to completely house a spare tire in such manner as to protect the tire against the action of the elements and the seepage of dust and other foreign matter into the carrier.

It is also a purpose of our invention to provide a tire carrier which permits of the ready removal or insertion of a tire to or from the carrier, and means for preventing rattling of the tire within the carrier.

Although we have herein shown and described only one form of tire carrier, it is to be understood that various changes and modifications may be made without departing from the spirit of the invention and the spirit and scope of the appended claims.

In the accompanying drawings:—

Figure 1 is a view showing in front elevation one form of tire carrier embodying our invention with the movable sections in open position;

Figure 2 is a vertical sectional view of the tire carrier shown in Figure 1 and with the movable sections in closed position;

Figure 3 is a transverse vertical section of the tire carrier shown in Figure 2.

Referring specifically to the drawings, in which similar reference characters refer to similar parts, our invention, in its present embodiment, comprises a tire carrier including a stationary section 15 adapted to be rigidly sustained upon the rear or side of an automobile body by means of brackets 16. The brackets are of any suitable form and are arranged in any suitable manner to obtain the result desired. The carrier also includes movable sections 17 and 18, these sections cooperating with the stationary section 15 to provide a carrier which is adapted to completely house a tire.

The sections 17 and 18 are movably sustained upon the stationary section 15 by means of hinges 19 so that the sections are capable of occupying an open position as shown in Figure 1, or a closed position, as shown in Figure 2. In the open position of the sections, the open side of the stationary section 15 is exposed to allow of the insertion of a tire designated at 20 into the section. The movable sections 17 and 18 may then be moved to closed position to completely house the tire.

As shown in Figures 1 and 3, certain of the edges of the sections 17 and 18 and the upper edge of the section 15 are provided with flanges 21 arranged to provide shoulders 22. These flanges are disposed in overlapped relation when the sections 17 and 18 are in closed position, thus cooperating with the flanges in providing a liquid- and dust-proof joint. The section 18 is provided with a second flange 23 which in the closed position of the sections 17 and 18 is disposed in overlapped relation to a flange 23ª of the section 17, so as to also form a liquid- and dust-proof joint between the sections.

For the purpose of preventing movement of the tire 20 within the carrier and to thus preclude the possibility of the tire rattling within the carrier, resilient members in the form of leaf springs 24 are secured within the sections in the manner clearly shown in Figure 2. The arrangement of the springs is such that with the sections 17 and 18 in closed position, the springs are slightly flexed so that they serve to securely hold the tire against movement within the casing. The sections 17 and 18 are adapted to be secured in closed position in any suitable manner, such as by a hasp 25 carried by one section and an eye 26 carried by the other section. A padlock 27 may be extended through the eye so as to retain the hasp in connecting position with respect to the sections.

To substantially reinforce and thus prevent the ready collapsing of the stationary section 15, an arcuate strip 28 of relatively heavy metal is riveted or otherwise secured to the outer side of the periphery of the section 15. This strip is of the same cross-sectional contour as the periphery of the section, so as to snugly fit the latter with its ends terminating below the upper edge of the section, as clearly shown in Figure 2. This strip 28 may be further employed to provide securing means for the brackets 16.

When it is desired to remove any foreign matter that might accumulate in the section 15 when the sections 17 and 18 are open, a screw plug 29 is removably mounted in the bottom of the section 15, as clearly shown in Figure 2.

We claim as our invention:—

1. A tire carrier comprising a semi-circular stationary section having a transversely curved bottom and straight sides, movable quarter circular sections hinged to the opposite ends of the curved bottom, said quarter circular sections having transversely curved tops and straight sides adapted to abut each other and the sides of the stationary section in forming a carrier to completely enclose a tire, and leaf springs carried by all of said sections, said leaf springs having each of their ends secured to the transversely curved parts of the sections with their middle portions in spaced relation thereto.

2. A tire carrier comprising a semi-circular stationary section having a transversely curved bottom and straight sides, movable quarter circular sections hinged to the opposite ends of the curved bottom, said quarter circular sections having transversely curved tops and straight sides adapted to abut each other and the sides of the stationary section in forming a carrier to completely enclose a tire, leaf springs carried by all of said sections, said leaf springs having their ends secured to the transversely curved parts of the sections with their middle portions in spaced relation thereto, an arcuate stiffening member secured to the transversely curved bottom of the stationary section, and supporting brackets secured to said stiffening member for supporting the carrier.

3. A tire carrier comprising a semi-circular stationary section having a transversely curved bottom and straight sides, movable quarter circular sections hinged to the opposite ends of the curved bottom, said quarter circular sections having transversely curved tops and straight sides adapted to abut each other and the sides of the stationary section in forming a carrier to completely enclose a tire, leaf springs carried by all of said sections, said leaf springs having their ends secured to the transversely curved parts of the sections with their middle portions in spaced relation thereto, there being an aperture formed through the bottom of the stationary member, and a plug for closing said aperture as and for the purpose described.

In testimony whereof we have signed our names to this specification.

JOHN H. BUFFINGTON.
LINCOLN L. WHITSON.